US012592233B2

(12) United States Patent　　　　(10) Patent No.: US 12,592,233 B2

Karakotsios et al.　　　　　　　　　(45) Date of Patent:　　Mar. 31, 2026

(54) GAZE-BASED COMMAND DISAMBIGUATION

(71) Applicant: Apple Inc., Cupertino, CA (US)

(72) Inventors: Kenneth M. Karakotsios, Scotts Valley, CA (US); James Byun, Los Angeles, CA (US); Pulah J. Shah, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 150 days.

(21) Appl. No.: 18/227,884

(22) Filed: Jul. 28, 2023

(65) Prior Publication Data

US 2024/0096319 A1　　Mar. 21, 2024

Related U.S. Application Data

(60) Provisional application No. 63/408,075, filed on Sep. 19, 2022.

(51) Int. Cl.
| | |
|---|---|
| *G10L 15/22* | (2006.01) |
| *G06F 3/01* | (2006.01) |
| *G06F 16/3329* | (2025.01) |
| *G06V 20/62* | (2022.01) |

(52) U.S. Cl.
CPC .............. *G10L 15/22* (2013.01); *G06F 3/013* (2013.01); *G06F 3/017* (2013.01); *G06F 16/3329* (2019.01); *G06V 20/62* (2022.01); *G10L 2015/223* (2013.01)

(58) Field of Classification Search
CPC ...... G10L 15/22; G06F 16/3329; G06V 20/62
See application file for complete search history.

(56) References Cited

U.S. PATENT DOCUMENTS

| | | | |
|---|---|---|---|
| 8,687,104 B2 | 4/2014 | Penov et al. | |
| 9,563,272 B2 | 2/2017 | Karakotsios et al. | |
| 9,691,000 B1 | 6/2017 | Karakotsios et al. | |
| 2016/0283778 A1* | 9/2016 | Karakotsios ........... | G06V 20/64 |
| 2016/0378861 A1* | 12/2016 | Eledath .................. | G06V 20/52 |
| | | | 707/766 |

FOREIGN PATENT DOCUMENTS

CN　　　112507799 A　　3/2021

OTHER PUBLICATIONS

International Preliminary Report on Patentability received for PCT Patent Application No. PCT/US2023/031573, mailed on Apr. 3, 2025, 10 pages.
International Search Report and Written Opinion from PCT/US2023/031573 dated Nov. 27, 2023, 12 pages.

* cited by examiner

*Primary Examiner* — Ibrahim Siddo
(74) *Attorney, Agent, or Firm* — YHE Law LLP

(57)　　　　ABSTRACT

Aspects of the subject technology provide improved techniques for human-computer interactions including disambiguation of a human user's linguistic command. The improved techniques may include integrating linguistic input from a user with additional input from sensors relating to the user and the user's environment. In an aspect, imagery of a user's environment may be first analyzed to identify objects in the environment. Input regarding the user, such as a user's gaze location, may trigger a second analysis of a subset of the identified objects in the environment. The results of these analyses may then be used to resolve an ambiguity in linguistic user input from the user.

39 Claims, 4 Drawing Sheets

100

200

300

400

GAZE-BASED COMMAND DISAMBIGUATION

CROSS REFERENCE TO RELATED APPLICATION

This application claims the benefit of U.S. Provisional Application No. 63/408,075, entitled "GAZE-BASED COMMAND DISAMBIGUATION," filed Sep. 19, 2022, the entirety of which is incorporated herein by reference.

TECHNICAL FIELD

The present description relates generally machine understanding of human communications, including natural language understanding.

BACKGROUND

Modern techniques have enabled computers to understand aspects of human environments and human communications. For example, computers may analyze images from a camera to identify objects in the images, and other techniques may analyze an audio recording to estimate words spoken by a user in the audio recording.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

While great strides have been made with artificial intelligence and machine learning to enable humans and computers to interact, various problems continue to prevent human-computer interactions to seem as natural as human-human interactions. In particular, computer understanding of human linguistic communication may require a more complete understanding of the context of a human speaker beyond the spoken words alone. For example, a human may ask a computer "What is this?", and for the computer to understand what "this" refers to, additional understanding of the context of the speaker may be required. "This" may refer to an object held in the hand of the speaker, an object the speaker is pointing to, or an object the user is gazing at while asking the question. Techniques are presented herein for improved human-computer interactions.

Improved techniques for human-computer interactions may include integrating linguistic input from a human user (such as words spoken, typed, or signed with gestures) with additional user input relating to the user and the user's environment. Sensors may provide input regarding the environment of a user such an image or video of an area proximate to the user. Sensors may also provide input regarding the user themselves, providing, for example, an indication of a user's hand gestures, posture, and/or gaze location. In an aspect, imagery of a user's environment may be first analyzed to identify objects in the environment. Input regarding the user themselves, such as a gaze location, may trigger a second (possibly deeper) analysis of a subset of the identified objects in the environment. The results of these analyses may then be used to resolve an ambiguity in linguistic user input from the user. In an aspect, the first and/or second analyses may be performed on the objects preemptively (e.g., in advance of the user asking or speaking about the objects) in order to reduce a latency required to understand or respond to the linguistic user input received. In another aspect, preemptive performance of analyses prior to receiving a command may resolve a timing problem where a command refers to an object that is no longer in the proximate area when the command is received.

Figure 1:
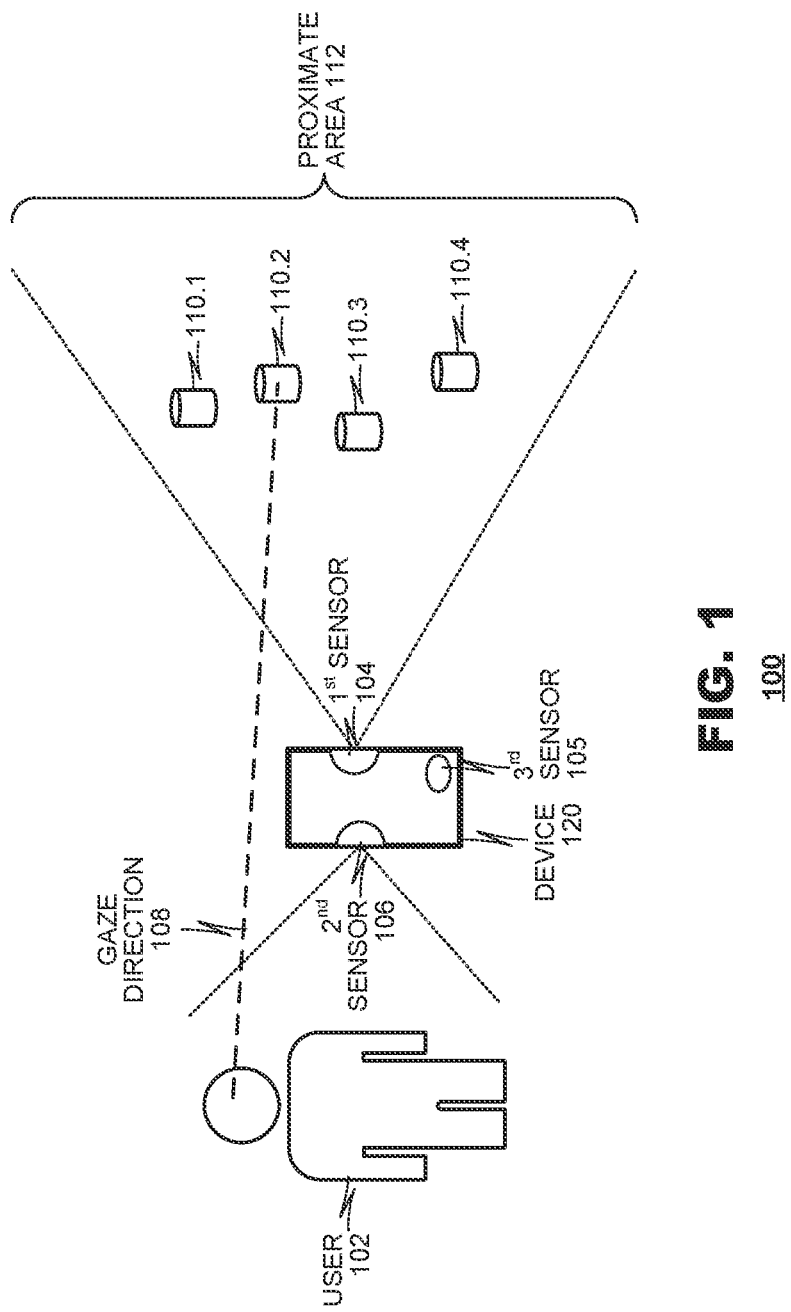
FIG. 1 illustrates an example system for sensing an environment of a human user.

FIG. 1 illustrates an example system 100 for sensing an environment of a human user. A proximate area 112 of a user 102 may include objects 110.1, 110.2, 110.3, 110.4. A device 120 may include first and second sensors 104, 106. The first sensor 104 may scan the proximate area 112 including the objects 110.1, . . . 110.4, while the second sensor 106 may scan the user 102. A third sensor 105 may accept a user command input, and may be, for example, a microphone. Device 120 may be, for example, a hand-held device such as a camera or tablet, a head-mounted device, or a freestanding device. The scan of the user (e.g., in conjunction with the scan of the proximate area 112) may indicate the user's interest in one or more of the objects in the proximate area 112. For example, a scan of the user by the second sensor 104 may indicate a visual gaze direction 108 of the user pointing toward the location of a particular object 110.2 detected in the scan of the proximate area 112. In other aspects not depicted, a scan of the user by the second sensor 106 may indicate a hand gesture and/or other body posture of the user that is indicative of the user's interest in one or more of the objects 110.X in the proximate area 112. For example, a user may point at a particular object with a finger or a device such as cell phone to indicate that particular object, hold a particular object in a hand, or bend over a particular object.

In one or more aspects, the first and second sensors 104 and 106 may be the same type of sensor, for example a camera for capturing images of a scene that includes the proximate area 112 or the user 102, respectively. In other aspects, the first and second sensors 104 and 106 may be different types of sensors or operate with different modalities. For example, the first sensor may be a camera producing visible light images, while the second sensor may be an eye tracker producing an indication of a user's eye position or user's gaze direction.

In other aspects not depicted in FIG. 1, a single sensor may be used to scan both the proximate area 112 and the user 102. In some cases, a single scan by a single sensor may simultaneously scan both the user 102 and the proximate area 112. For example, a scene captured by a single camera may include imagery of both the proximate area 112 of the user and the user 102 in the single image. In other cases, a single sensor may scan the user 102 and the proximate area 112 in separate scans. For example, a single camera may be oriented to capture a first scene including the proximate area 112 in a first image and then reoriented to capture a second scene including the user 102 in a second image.

In other aspects not depicted in FIG. 1, the first and second sensors 104, 106 may be embodied in different devices. For example, a first hand-held device, such as a tablet or camera, may include the first sensor 104, while a head-mounted device includes the second sensor 106. In an aspect, these separate devices may be configured to work together as a system for command disambiguation. In other aspects, a system for disambiguation may include a third sensor or other user input feature capable or accepting a user command. For example, a third sensor may be a microphone included in device 120, may be included in a separate device such as an earbud or other headset, or may be included as a free-standing separate device for audio interactions with user 102.

The system 100 may include various sensors 104, 106 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the system 100 may include hardware elements that can receive user input such as hardware buttons or switches. User input detected by such sensors and/or hardware elements correspond to various input modalities for interacting with virtual content displayed within a given extended reality environment. For example, such input modalities may include, but not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc.

Figure 2:
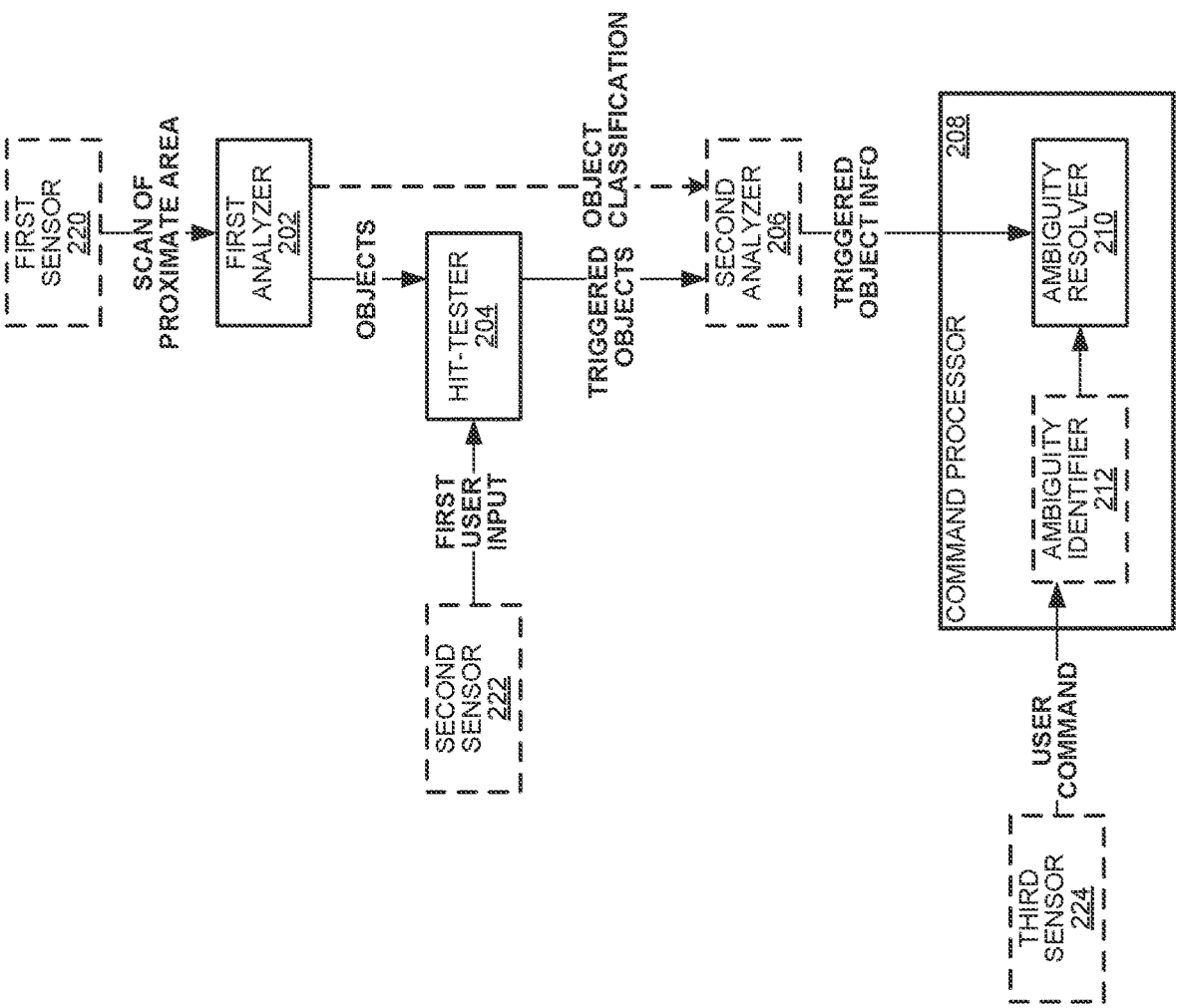
FIG. 2 illustrates an example system for understanding a user command.

FIG. 2 illustrates an example system 200 for semantically understanding a user command. System 200 may be an example of device 120 of FIG. 1. A first analyzer 202 may analyze a scan of a user's proximate area to identify objects in the proximate area. A hit-tester 204 may compare a first user input to the objects identified by the first analyzer in order to identify triggered objects that may be a subset of all objects in the proximate area. A command processor 208 for processing user commands may include an ambiguity resolver for resolving an ambiguity in a user command based on information about the triggered objects.

In optional aspects, the system 200 may include a second analyzer for analyzing the triggered objects to produce the information about the triggered objects. In other aspects, a remote second analyzer may exist separately from the system 200, for example in the computing cloud, and the system 200 may be connected via a computer network to the remote second analyzer. Such a remote second analyzer may provide the information regarding triggered objects in response to requests from the system 200. In an aspect, a transmitter (not depicted) may send a request for second analysis to a remote second analyzer, and a receiver (not depicted) may receive the requested information from the remote second analyzer. Command processor 208 may include an ambiguity identifier 212 for identifying ambiguities in a user command. In an aspect, command processor 208 may also perform the user command after resolving an identified ambiguity in the user command. For example, when the user command includes a question, the command processor 208 may answer the user's question.

In an aspect, first and second analyzers 202, 206 may be implemented on a single device. In other aspects, second analyzer may require access to information not available locally, or may require more computing resources as compared to the first analyzer, for example because second analysis require substantially larger storage, processor power, or other computing resources. When the computing resource requirements are not similar between first and second analysis, efficiencies may be gained by implementing first and second analyses on separate devices. In an aspect, second analyzer may be implemented on a cloud-computing device, and second analyzer may be shared amongst many devices with command disambiguation systems.

In an optional aspect, the first analyzer may additionally identify a classification of one or more of the objects identified by the first analyzer. For example, an identified object may be classified as a house plant or classified as containing text. When a classified object is selected as a triggered object (such as by hit-tester 204), the second analyzer may further base its analysis of a triggered object on the triggered object's classification. In some cases, the first analysis may result in a coarse classification, while the second analysis may result in a more refined classification with more details and/or a classification within a larger number of classes. For example, a first classification may classify an object only as a "book," while the second analysis may identify the title of the book, the author of the book, the number of pages in the book, and web links to an audio book version of the book and a review of the book.

In other optional aspects, system 200 may include one or more sensors. For example, a first sensor 220 may generate a scan of a proximate area; second sensor 222 may detect a first user input; and a third sensor 224 may capture a user command. In aspects, one or more of the first, second, and third sensor may be combined. For example, first and second sensors may be a single camera sensor capable scanning the proximate area of a user and the user themselves; alternately second and third sensors may be combined to be a single camera sensor capable of capturing a first user input including a hand gesture as well as capturing a user command as gestured sign language.

In one or more aspects, elements of FIG. 2, such as 202, 204, 206, and 208, may be implemented as a computer program executed on one or more processors. Each of the elements of FIG. 2 may also be implemented with artificial intelligence processor such as a neural network using weights trained with training data. In aspects, the elements of FIG. 2 may be implemented as one or more convolutional neural network ("CNN")-based and/or generative adversarial network ("GAN")-based methods or processors, as an application specific integrated circuit, or generally as any integrated circuit or processing circuitry In one or more aspects, hit-tester 204 may select one or more triggered objects from the set of objected identified by first analyzer 202. The triggered object(s) may be selected, based on a comparison of first user input with information regarding the objects identified by the first analyzer. A first user input may be based on a user's fixation on an object, gaze direction or location, a gesture such as a pointing finger, or a body posture. In an example of hit-testing, the first user input may indicate a location within the scanned proximate area, and one or more objects at or near the indicated location may be selected as the triggered objects. In an aspect, the first analyzer may identify objects including the object's location or range of locations, such as a bounding box for detected objects. In an aspect, only the closest object may be select; in another aspect all objects without a threshold distance may be selected as triggered objects. In another aspect, selection of an object as a triggered object may trigger a request for analysis of that triggered object by the second analyzer.

In one or more aspects, second analyzer may produce a variety of information regarding the triggered objects, and may be provided as a feature vector that enumerates a variety of different features regarding the analyzed object. Triggered object information produced by second analyzer may be derived from visual information (such as an image of a book containing the book's title) or other information (such as a direction from the user to the object from a different type of sensor, such as a directional radio sensor). In an example of a book object, a second analysis of the book object might include the title, author, number of pages, a link to an audio book version of the book, and a link for buying the book, and a review rating for the book. These pieces of information about the book may be collectively organized into a feature vector. Additional examples of objects identified by a first analyzer 202 and their corresponding information produced by a second analyzer 206 may include: a house plant may have corresponding information identifying the plant's species and care information; a person may have corresponding information identifying the person's name and contact information; a box of cereal may have corresponding information identifying the cereal's nutritional information; etc.

In an aspect, the scan of the proximate area includes one or more images of the proximate area, the first analyzing may include analyzing the image(s) at a first resolution, while the second analyzing may include analyzing the images (or portions of the image(s) corresponding to the triggered objects) at a second resolution higher than the first resolution.

Figure 3:
FIG. 3 illustrates an example method for understanding a user command.

FIG. 3 illustrates an example method 300 for semantically understanding a user command. Method 300 includes identifying objects in a proximate area of a user by a first analyzing of a scan of the proximate area (box 304). A first user input may be used to identify a subset of the identified objects as triggered objects (box 306). A request for first information regarding the triggered objects (box 308) may be sent, for example, to a remote device that performs a second analyzing to determine the requested first information. The requested information regarding the triggered objects may be received (box 310), for example from the remote device or other second analyzing device. An ambiguity in a user command may be resolved based on the received first information regarding the triggered objects (box 312), for example in response to a determination that a user command includes an ambiguity.

In optional aspects of method 300, a proximate area may be scanned to produce a scan of the proximate area (box 302), for example by converting raw sensor data into a format for use by a first analyzing operation. An ambiguity may be identified in a user command (box 316), for example by a natural language command processor based on a linguistic user command received from a user. The user command may be performed (box 314) based on the resolved ambiguity in the user command. In an aspect, the performance of the user command may be done locally along with the other operations of method 300, or in another aspect, the performance of the user command may be done remotely, such as in response to a request from the local device for the remove device to perform the command.

In an optional aspect, the second information may be determined from the first information (box 318), and the command may be performed based on the second information. For example, a book object may be triggered (box 306), resulting first information including the title of the book. In response to command include a user question about the author of the book, second information indicating the author's name may be determined from the title (box 318). Then the command may be performed (box 314) by answering the user's question about the author.

In one or more aspects, the first user input (for identifying the triggered objects) and the user command may be received via two different user input modalities. For example, the first user input may be obtained via a passive modality, such as a video camera for monitoring and/or scanning a user's gaze or hand movements which may allow a user to be passively monitored without a user's deliberate engagement of a user command system, while the user command may be received via an active modality, such as via a microphone recording a user's deliberate spoken command.

In one or more aspects, a user command may include an ambiguity due to an implicit reference to a subject of the command. For example, a user command to "turn up the volume" may have a loudspeaker as an implicit subject, or a user question of "who wrote that book" may implicitly reference a book that the user is looking at or that is nearby the user without explicitly identifying the title of the book. In the first example, a first analysis of scanned scene may identify a black box as an object in the scene. A first user input including a viewer's gaze at the black box may trigger a request for a second analysis of imagery of the black box, and the second analysis may return information about the black box indicating that the black box is a loudspeaker and the information may also include an indication of a control mechanism for controlling the speaker. Later, when the user command for "turn up the volume" is received, a command processor may identify an implicit-type ambiguity in the command because the subject of the command is not identified in the command itself. The command processor may resolve the implicit-type command by reviewing recently triggered objects to select which recently triggered object might best match the missing subject of the currently ambiguous command. In an aspect, the selection of the recently triggered object may be based on a classification from a first analysis, and/or may be based on the information resulting from a second analysis. The command processor may use the information indicating the control mechanism of the loudspeaker to perform the command to increase the volume.

In one or more aspects, a user command may include an ambiguity due to an indirect reference to a subject of the command. For example, a user command to answer the question "what is this," or "who wrote that book." In this case, the explicit subject of the command, "this," is an indirect reference to some other ambiguous subject. In this indirect-type ambiguity example, a first analysis of a scanned scene may identify a book as an object in the scene. A first user input including a viewer's gaze at the book trigger a request for a second analysis of imagery of the book, and the second analysis may return information about the book indicating the book's title and author. Later, when the user command for "what is this," or "who wrote that book" is received, even possibly after the book has left the scene, a command processor may identify the indirect-type ambiguity in the command, which the command processor may resolve by reviewing recently triggered objects to select a best match the indirect subject of the currently ambiguous command. The command can then be performed by answering the user's question using information from the second analysis indicating the title and author of the book.

In one or more aspects, a user command may be received via linguistic input from a user, such as spoken or typed words. The command processor may analyze the command, for example, using a natural language processor. The natural language processor may identify one or more ambiguities in the command, and may attempt to resolve the ambiguities based on the one or more triggered objects that have been triggered by the first user input, such as when a first user input is received within a threshold time difference from the time of receiving the user command with an ambiguity. In an aspect, a question from a user may be construed as a command to answer the question. In an aspect the triggered object information produced by a second analysis may be used to resolve an ambiguity in the user command. In another aspect, after resolving an ambiguity in the user command, triggered object information may be used to perform the user command.

In one or more aspects, a time difference between receiving a first user input and receiving a user command may allow pre-fetching of a triggered object by triggering the request for information regarding the triggered object prior to receiving the user command. Such pre-fetching for one or more triggered objects before a command is received may reduce a latency for processing and/or performing the user command when the user command is received. In an aspect, the triggered objects may constitute only a subset of the identified objects. For example, hundreds of objects may be identified (box 304) in a user's proximate area, while one object is triggered by the first user input. By requesting additional information (box 308) for only objects triggered by the first user input, a latency for receiving the information may be reduced because fewer objects need to be analyzed in response to the request for additional information. Such a latency reduction may be substantial when the processing requirements for the second analysis are large as compared to the first analyzing processing requirements.

In one or more aspects, the scan of the proximate area may include imagery of text, and the text may be identified as an object by the first analyzer. In as aspect, the first analysis of the text object may classify the object as text. In another aspect, the second analysis of the text object may include performing text recognition of the imagery containing the text to produce a computer understandable version of the text, which may be received in box 310 as information regarding the text imagery object.

Figure 4:
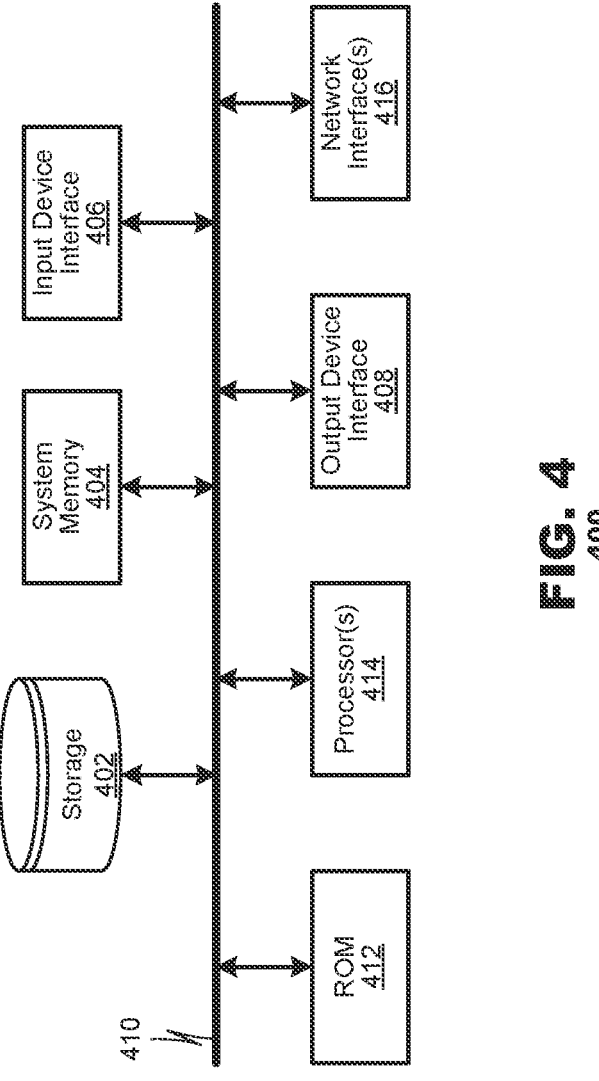
FIG. 4 illustrates an example computing device with which aspects of the subject technology may be implemented.

FIG. 4 illustrates an example computing device 400 with which aspects of the subject technology may be implemented in accordance with one or more implementations. The computing device 400 can be, and/or can be a part of, any computing device or server for generating the features and processes described above, including but not limited to a laptop computer, a smartphone, a tablet device, a wearable device such as a goggles or glasses, an earbud or other audio device, a case for an audio device, and the like. The computing device 400 may include various types of computer readable media and interfaces for various other types of computer readable media. The computing device 400 includes a permanent storage device 402, a system memory 404 (and/or buffer), an input device interface 406, an output device interface 408, a bus 410, a ROM 412, one or more processing unit(s) 414, one or more network interface(s) 416, and/or subsets and variations thereof.

The bus 410 collectively represents all system, peripheral, and chipset buses that communicatively connect the numerous internal devices of the computing device 400. In one or more implementations, the bus 410 communicatively connects the one or more processing unit(s) 414 with the ROM 412, the system memory 404, and the permanent storage device 402. From these various memory units, the one or more processing unit(s) 414 retrieves instructions to execute and data to process in order to execute the processes of the subject disclosure. The one or more processing unit(s) 414 can be a single processor or a multi-core processor in different implementations.

The ROM 412 stores static data and instructions that are needed by the one or more processing unit(s) 414 and other modules of the computing device 400. The permanent storage device 402, on the other hand, may be a read-and-write memory device. The permanent storage device 402 may be a non-volatile memory unit that stores instructions and data even when the computing device 400 is off. In one or more implementations, a mass-storage device (such as a magnetic or optical disk and its corresponding disk drive) may be used as the permanent storage device 402.

In one or more implementations, a removable storage device (such as a floppy disk, flash drive, and its corresponding disk drive) may be used as the permanent storage device 402. Like the permanent storage device 402, the system memory 404 may be a read-and-write memory device. However, unlike the permanent storage device 402, the system memory 404 may be a volatile read-and-write memory, such as random-access memory. The system memory 404 may store any of the instructions and data that one or more processing unit(s) 414 may need at runtime. In one or more implementations, the processes of the subject disclosure are stored in the system memory 404, the permanent storage device 402, and/or the ROM 412. From these various memory units, the one or more processing unit(s) 414 retrieves instructions to execute and data to process in order to execute the processes of one or more implementations.

The bus 410 also connects to the input and output device interfaces 406 and 408. The input device interface 406 enables a user to communicate information and select commands to the computing device 400. Input devices that may be used with the input device interface 406 may include, for example, alphanumeric keyboards and pointing devices (also called "cursor control devices"). The output device interface 408 may enable, for example, the display of images generated by computing device 400. Output devices that may be used with the output device interface 408 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, the bus 410 also couples the computing device 400 to one or more networks and/or to one or more network nodes through the one or more network interface(s) 416. In this manner, the computing device 400 can be a part of a network of computers (such as a LAN, a wide area network ("WAN"), or an Intranet, or a network of networks, such as the Internet. Any or all components of the computing device 400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
scanning a proximate area with at least one sensor;
first analyzing the scan of the proximate area to identify objects in the proximate area;
after first analyzing the scan of the proximate area, detecting a trigger corresponding to at least one of the identified objects based on a first user input with respect to the at least one of the identified objects;
in response to detecting the trigger;
transmitting a request for first information regarding the at least one of the identified objects; and
receiving, in response to the request, information regarding the at least one of the identified objects;
receiving a command from a user, wherein the command includes an ambiguity;
resolving the ambiguity in the command based on the information regarding the at least one of the identified objects; and
performing the command based at least in part on the resolved ambiguity.

2. The method of claim 1, wherein:
the first user input is received via a first user input modality; and
the command is received via a second user input modality different from the first user input modality.

3. The method of claim 2, wherein the first user input modality is a passive user input modality.

4. The method of claim 1, wherein the ambiguity in the command includes an implicit reference to one or more of the at least one of the identified objects.

5. The method of claim 1, wherein the ambiguity in the command includes an indirect reference to one or more of the at least one of the identified objects.

6. The method of claim 1, wherein:
the first analyzing further identifies a classification of the identified objects; and
the transmitting the request for information includes the classification.

7. The method of claim 1, wherein:
the scan of the at least one of the identified objects includes a text image;
the first analyzing classifies the at least one of the identified objects as including a text image; and
the received information includes recognized text corresponding to the text image.

8. The method of claim 1, wherein the first user input with respect to the at least one of the identified objects includes a gaze of the user persisting on the at least one of the identified objects for a predetermined amount of time.

9. The method of claim 1, wherein the first user input with respect to the at least one of the identified objects includes a hand gesture relating to the at least one of the identified objects.

10. The method of claim 1, wherein:
the first analyzing is based on first imagery of the proximate area;
the transmitting the request includes transmitting second imagery of the at least one of the identified objects;
the first imagery includes the at least one of the identified objects at a first resolution; and
the second imagery includes the at least one of the identified objects at a second resolution higher than the first resolution.

11. The method of claim 1, wherein the command is received linguistically from the user.

12. The method of claim 1, wherein;
the command is a question; and
performing the command includes answering the question.

13. The method of claim 1 wherein;
the performing of the command includes determining second information based on the first information; and
the performing of the command is based on the second information.

14. A device comprising:
a memory; and
at least one processor configured to:
scan a proximate area with at least one sensor;
first analyze the scan of the proximate area to identify objects in the proximate area;
after first analyzing the scan of the proximate area, detect a trigger corresponding to at least one of the identified objects based on a first user input with respect to the at least one of the identified objects;
in response to detecting the trigger:
transmit a request for information regarding the at least one of the identified objects; and receive, in response to the request, information regarding the at least one of the identified objects;

receive a command from a user, wherein the command includes an ambiguity;

resolve the ambiguity in the command based on the information regarding the at least one of the identified objects; and perform the command based at least in part on the resolved ambiguity.

15. The device of claim 14, wherein:

the first analyzing further identifies a classification of the identified objects; and the transmitting the request for information includes the classification.

16. The device of claim 14, wherein:

the scan of the at least one of the identified objects includes a text image;

the first analyzing classifies the at least one of the identified objects as including a text image; and the received information includes recognized text corresponding to the text image.

17. The device of claim 14, wherein the first user input with respect to the at least one of the identified objects includes a gaze of the user persisting on the at least one of the identified objects for a predetermined amount of time.

18. The device of claim 14, wherein:

the first user input is received via a first user input modality; and the command is received via a second user input modality different from the first user input modality.

19. The device of claim 18, wherein the first user input modality is a passive user input modality.

20. The device of claim 14, wherein the ambiguity in the command includes an implicit reference to one or more of the at least one of the identified objects.

21. The device of claim 14, wherein the ambiguity in the command includes an indirect reference to one or more of the at least one of the identified objects.

22. The device of claim 14, wherein the first user input with respect to the at least one of the identified objects includes a hand gesture relating to the at least one of the identified objects.

23. The device of claim 14, wherein:

the first analyzing is based on first imagery of the proximate area;

the transmitting the request includes transmitting second imagery of the at least one of the identified objects;

the first imagery includes the at least one of the identified objects at a first resolution; and the second imagery includes the at least one of the identified objects at a second resolution higher than the first resolution.

24. The device of claim 14, wherein the command is received linguistically from the user.

25. The device of claim 14, wherein:

the command is a question; and performing the command includes answering the question.

26. The device of claim 14 wherein:

the performing of the command includes determining second information based on the first information; and the performing of the command is based on the second information.

27. A non-transitory computer readable memory including instructions that, when executed by a processor, cause the processor to:

scan a proximate area with at least one sensor;

first analyze the scan of the proximate area to identify objects in the proximate area;

after first analyzing the scan of the proximate area, detect a trigger corresponding to at least one of the identified objects based on a first user input with respect to the at least one of the identified objects;

in response to detecting the trigger;

transmit a request for information regarding the at least one of the identified objects; and receive, in response to the request, information regarding the at least one of the identified objects;

receive a command from a user, wherein the command includes an ambiguity;

resolve the ambiguity in the command based on the information regarding the at least one of the identified objects; and perform the command based at least in part on the resolved ambiguity.

28. The non-transitory computer readable memory of claim 27, wherein:

the first analyzing further identifies a classification of the identified objects; and the transmitting the request for information includes the classification.

29. The non-transitory computer readable memory of claim 27, wherein;

the scan of the at least one of the identified objects includes a text image;

the first analyzing classifies the at least one of the identified objects as including a text image; and the received information includes recognized text corresponding to the text image.

30. The non-transitory computer readable memory of claim 27, wherein the first user input with respect to the at least one of the identified objects includes a gaze of the user persisting on the at least one of the identified objects for a predetermined amount of time.

31. The non-transitory computer readable memory of claim 27, wherein:

the first user input is received via a first user input modality; and the command is received via a second user input modality different from the first user input modality.

32. The non-transitory computer readable memory of claim 31, wherein the first user input modality is a passive user input modality.

33. The non-transitory computer readable memory of claim 27, wherein the ambiguity in the command includes an implicit reference to one or more of the at least one of the identified objects.

34. The non-transitory computer readable memory of claim 27, wherein the ambiguity in the command includes an indirect reference to one or more of the at least one of the identified objects.

35. The non-transitory computer readable memory of claim 27, wherein the first user input with respect to the at least one of the identified objects includes a hand gesture relating to the at least one of the identified objects.

36. The non-transitory computer readable memory of claim 27, wherein:

the first analyzing is based on first imagery of the proximate area;

the transmitting the request includes transmitting second imagery of the at least one of the identified objects;

the first imagery includes the at least one of the identified objects at a first resolution; and the second imagery includes the at least one of the identified objects at a second resolution higher than the first resolution.

37. The non-transitory computer readable memory of claim 27, wherein the command is received linguistically from the user.

38. The non-transitory computer readable memory of claim 27, wherein:

the command is a question; and performing the command includes answering the question.

39. The non-transitory computer readable memory of claim 27 wherein:

the performing of the command includes determining second information based on the first information; and the performing of the command is based on the second information.

* * * * *